Nov. 10, 1936.  L. M. BARTLETT  2,060,604
RESILIENT SUPPORT FOR ENGINES
Filed Nov. 16, 1935   2 Sheets-Sheet 1

WITNESSES

INVENTOR:
LAWRENCE M. BARTLETT,
DECEASED,
BY EDWARD R. BARTLETT,
EXECUTOR

ATTORNEYS

Nov. 10, 1936.  L. M. BARTLETT  2,060,604
RESILIENT SUPPORT FOR ENGINES
Filed Nov. 16, 1935  2 Sheets-Sheet 2
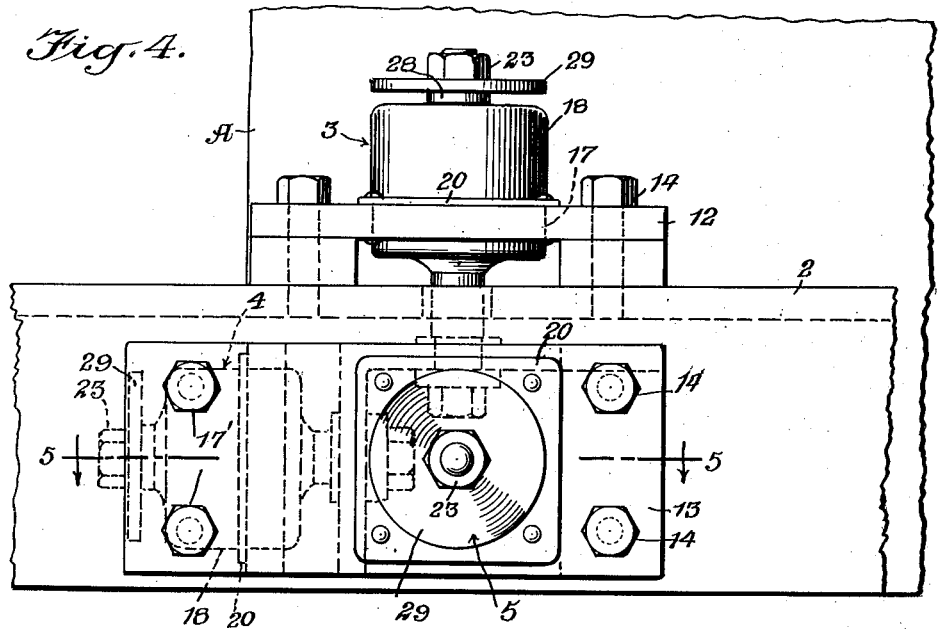
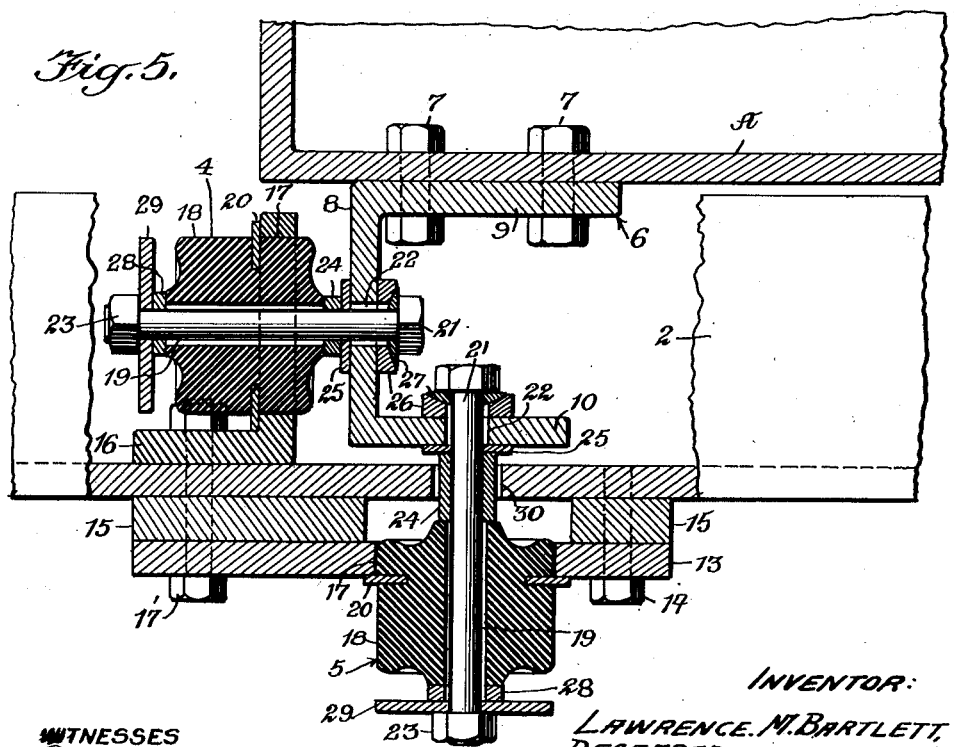
INVENTOR:
LAWRENCE. M. BARTLETT,
DECEASED,
By EDWARD R. BARTLETT,
EXECUTOR
ATTORNEY Patented Nov. 10, 1936

2,060,604

UNITED STATES PATENT OFFICE 2,060,604

RESILIENT SUPPORT FOR ENGINES

Lawrence M. Bartlett, deceased, late of Buffalo, N. Y., by Edward R. Bartlett, executor, Bronxville, N. Y.

Application November 16, 1935, Serial No. 50,227

3 Claims. (Cl. 248—5)

This invention relates to a resilient support for engines or motors, and is especially designed for supporting the engine or motor of an aircraft, the object of the invention being to provide a resilient mounting which will absorb vibrations in at least six directions.

It is a well-known fact that engines, particularly those on aircraft, are subject to considerable vibration which affects the life of the engine and also the life of the aircraft, and it is a broad purpose of the invention to so support the engine to reduce this vibration to a minimum.

More specifically, a means is provided for supporting an airplane or automotive engine of any shape, by suspension at several points from one or more of the principal and more rigid members of the airplane structure by elastic supports of a comparatively nonrigid nature, such as springs or rubber for the purpose of reducing vibration effects.

These supports are arranged in such a manner that they afford elastic support against motion of translation along three principal axes at right angles to each other and also against rotation about these same axes. They therefore protect the structure against six modes of vibration.

The elastic supports may be each composed of three elastic and pivoted elements, such as springs, or each elastic support may be composed of one unit capable of offering resistance to the six modes of vibration described.

The size and strength of the elastic elements are made proportional to the weight of the engine in accordance with natural laws in such a way that the amplitude of vibrations caused by disturbing forces on the engine is made much smaller than it would be with rigid connections. The magnitude of the amplitude is made as small as desired for practical reasons for any given engine. The essential feature of these supports is that they reduce the undesirable effects not only of one but of six modes of vibration any or all of which may occur. They reduce the effects of reactive forces on the engine, thus increasing its life. They reduce the effects of vibrations of all members of the structure on which the engine is used, increasing the life of the structure.

They eliminate the possibility of the dangerous condition of resonance with very wide vibration in any of the six modes. They decrease the discomfort caused passengers by the physical effects of vibrations.

With these and other objects in view, the invention consists in certain novel features of construction and combinations and arrangements of parts, all of which will be more fully hereinafter described and pointed out in the claims.

In the accompanying drawings—

Figure 4 is a view in elevation looking at the righthand side of Figure 3;

Figure 5 is a view in section on the line 5,5 of Figure 4;

Figure 1:
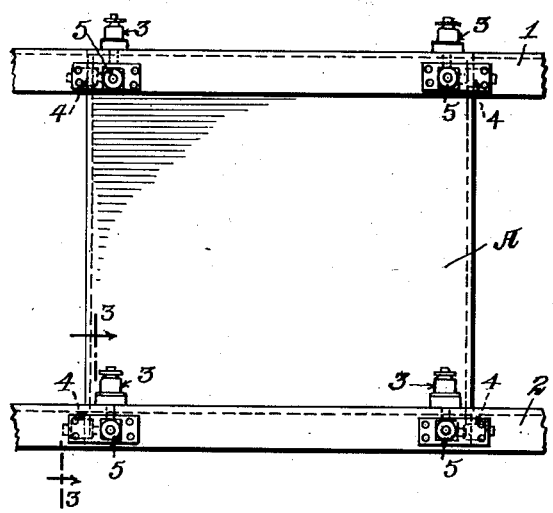
Figure 1 is a view in elevation more or less diagrammatic, illustrating the invention.
Figure 2:
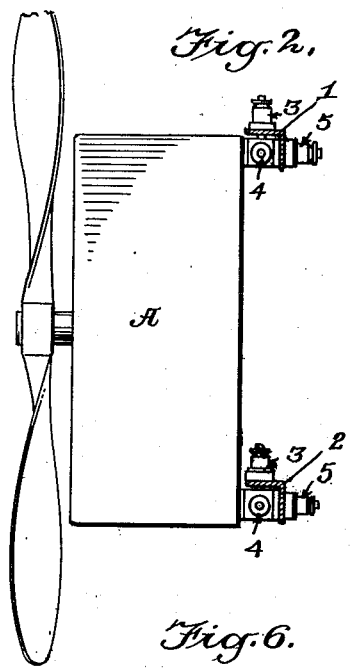
Figure 2 is a sectional elevation at right angles to Figure 1.
Figure 3:
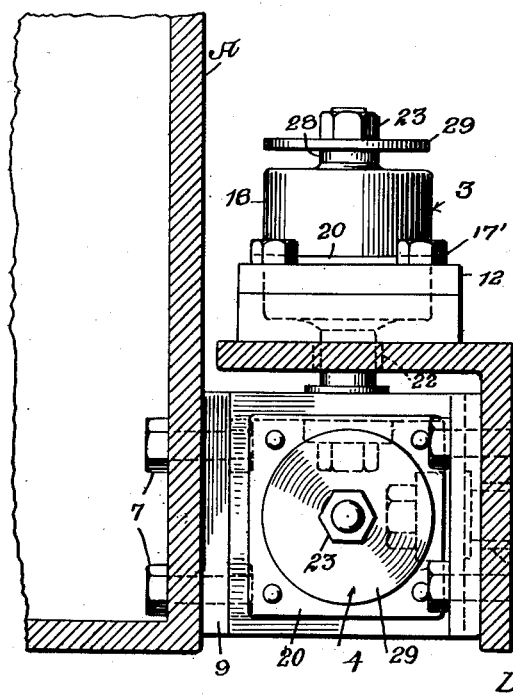
Figure 3 is an enlarged view in sectional elevation upon the staggered line 3,3 of Figure 1.

Reference character A illustrates more or less diagrammatically an engine or motor and 1 and 2 are angle irons reversely positioned spaced in parallelism and constituting a portion of the aircraft and to which the engine or motor A is connected by improved shock absorbers which will now be described. Four of these shock absorber assemblages are illustrated, one shock absorber being at each corner of the engine, although it is to be distinctly understood that any desired movement of these assemblages may be employed and located as desired for best results. All of these assemblages are alike in that they each include a vertically disposed shock absorber 3 and two horizontally disposed shock absorbers 4 and 5, respectively. The shock absorbers 4 and 5 are disposed at right angles to each other and to distinguish them, hereinafter reference will be made to the shock absorber 4 as being longitudinally disposed relative to the engine, and the shock absorber 5 being transversely disposed relative to the engine. Thus, in each shock absorber assemblage, a vertical shock absorber, a longitudinal shock absorber, and a transverse shock absorber are provided so that each shock absorber assemblage takes care of vibrations up and down or vertically longitudinally back and forth and transversely in and out so that the vibrations are cared for in six main directions, although the absorbers are so mounted that in a very real sense they are universal mountings so that vibrations are cared for in practically all directions.

The views 3, 4, and 5 are more specifically of the lower lefthand shock absorber assemblage illustrated in Figure 1, and this assemblage differs from the other three assemblages only in the disposition of the several shock absorbers. To be more specific, in all of the assemblages the vertical shock absorbers 3 are at the top or upper portion of the assemblages. In the two assemblages at the left of Figure 1, the longitudinal shock absorber 4 is at the left of the assemblage, and in the two shock absorber assemblages at the right of Figure 1 longitudinal shock absorbers 4 are at the right of the assemblages, and in all of of the assemblages the transverse shock absorbers 5 are positioned alike. Hence, with the exception of the general arrangement of the absorbers the construction of each assemblage is alike, and the description hereinafter of one assemblage will apply alike to all.

A rectangular bearing fitting 6 is secured by bolts 7 to the engine or motor A, and this fitting comprises a rectangular angle iron comprising a web 8 having integral flanges 9 and 10 at the ends thereof and a top flange or web 11 integral with the web 6 and flanges 9 so that the fitting is a somewhat square, hollow, angular, coupling member. Plate bearings 12 and 13 are secured by bolts 14 to the sides of angle iron 2 and spaced therefrom by blocks 15. An angle iron bracket 16 is secured by bolts 17' to the angle 2 and located transversely thereof so that these plates 12 and 13 and the angle iron bracket 16 provide three walls at right angles to each other. All of these walls are formed with openings 17 through which shock absorbers 18 project. These shock absorbers 18 are illustrated as of rubber or other resilient material of general cylindrical form having central longitudinal bores 19 and provided with plate washers 20 anchored in the absorbers projecting beyond the walls of the absorbers, and secured to the plates 12, 13 and bracket 16 as illustrated. Bolts 21 extend through the bores 19 of the shock absorbers 18 and through openings 22 in the fitting 6 and have nuts 23 screwed onto their outer ends. Bushings 24 and washers 25 are interposed between the absorbers 18 and the fitting 6 and between the heads of the bolts 21 and the inner faces of the fittings, cupped washers 26 and convex washers 27 engaging the same are interposed so that there is a somewhat universal mounting or coupling engagement between the bolt heads and the fitting 6. On the outer ends of the bolts spacing washers 28 and plate washers 29 are interposed between the absorbers and the nuts 23, the plate washers 29 being of such a diameter as to engage the absorbers and prevent any possibility of the bolts pulling out of the same even though there be a considerable collapse or wear which would enlarge the bores 19. In other words, these plate washers 29 are located for emergency use. They do not ordinarily function, but only come into use in the event of collapse or wear of the absorbers. The flanges of the angles 2 have openings 30 therein which are appreciably greater in diameter than the bushings 24 which project through said openings so as to allow for a certain amount of lateral movement of the vertical and transverse absorbers.

Figure 6:
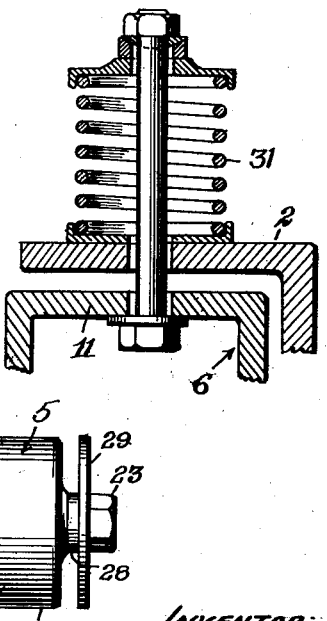
Figure 6 is a fragmentary view in vertical section illustrating a modification.

While the absorbers have been defined as of rubber or other material, it is well within the scope of the invention to substitute therefor ordinary coil springs, such as indicated at 31 in Figure 6, and this Figure 6 is merely illustrative of the fact that coil springs 31 may be substituted for the absorbers illustrated in the other figures of the drawings and in other respects the construction and arrangement would be substantially the same.

It will be apparent that by reason of the several assemblages and their arrangement of absorbers the vibrations are cared for and compensated for in at least six main directions, thus lengthening the life of the engine and its mounting and while in the description and drawings, specific forms are illustrated, it is to be distinctly understood that the invention is not limited in this respect but that certain changes and modifications may be had which would come within the spirit and scope of the appended claims.

What is claimed is:—

1. An engine mounting, including a support and an engine, of a shock absorber assemblage comprising three shock absorbers at right angles to each other, bolts extending through each shock absorber, an angular fitting to which all of the bolts are coupled, said bolts projecting through openings in the support and in the fitting of appreciably greater diameter than the diameter of the bolts, said fitting secured to the engine and said absorbers operatively engaging the support.

2. An engine support, including a shock absorber assemblage consisting of three shock absorbers at right angles to each other, supports engaged by the shock absorbers and through which the absorbers project, bolts projecting through the absorbers, an angular fitting through which the bolts project, said fitting secured to the engine, cupped washers and convex washers between the bolt heads and the fitting providing universal mounting for the bolts and bearing plates on the absorbers secured to the supports.

3. An engine support, including a shock absorber assemblage consisting of three shock absorbers at right angles to each other, supports engaged by the shock absorbers and through which the absorbers project, bolts projecting through the absorbers, an angular fitting through which the bolts project, said bolts projecting through openings in the support and in the fitting of appreciably greater diameter than the diameter of the bolts, said fitting secured to the engine, cupped washers and convex washers between the bolt heads and the fitting providing universal mounting for the bolts and bearing plates on the absorbers secured to the supports, and plate washers on the outer ends of the bolts normally spaced from the ends of the absorbers.

EDWARD R. BARTLETT,
*Executor of the Estate of Lawrence M. Bartlett, Deceased.*